United States Patent Office 2,973,327
Patented Feb. 28, 1961

2,973,327
BONDED MOLECULAR SIEVES
William J. Mitchell, Kenmore, and Ward F. Moore, Tonawanda, N.Y., assignors to Union Carbide Corporation, a corporation of New York
No Drawing. Filed Nov. 5, 1956, Ser. No. 620,177
29 Claims. (Cl. 252—449)

This invention relates to adsorbents of the molecular sieve type and more particularly to bonded molecular sieves of the zeolite family and a method for preparing the bonded materials, as for example in the form of pellets.

Zeolites are hydrated metal alumino silicates having the general formula:

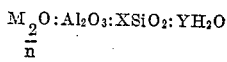

wherein "M" represents a metal, and "$n$" its valence. In general, a particular zeolite will have values for "X" and "Y" that fall in a definite range.

Many of these zeolites are three-dimensional crystals. Activation of these crystalline zeolites by effecting the loss of the water of hydration leaves a crystalline structure interlaced with channels of molecular dimensions offering very high surface area for the adsorption of foreign molecules.

Adsorption is limited to molecules having size and shape such as to permit entrance through the pores to the inner sorption area, all other molecules being excluded. The common adsorbents such as charcoal and silica gel do not exhibit molecular sieve action.

Some of the zeolitic molecular sieves employed for this purpose, for example chabazite, are found in nature and some of these as well as others may be synthesized. Certain synthetic molecular sieves which are not found in nature but which exhibit the desirable adsorptive properties are described in patent applications, Serial Nos. 400,387 (abandoned), 400,388 and 400,389, filed December 24, 1953, now Patent Nos. 2,882,243 and 2,882,244.

A prime difficulty encountered in effectively employing the adsorptive properties of these molecular sieves is attributable to their extremely fine particle size. The individual crystals commonly have diameters of from ½ to 30 microns in size. Large naturally-formed agglomerates of these crystals readily break up into smaller particles when handled. Crystals of this size are not too satisfactory for use in fixed beds such as are employed in fluid separations. This is true because fine particles cause a pressure drop through the bed that is prohibitively high. Additional difficulties are encountered when efforts are made to fluidize the small crystals. Under these circumstances it is desirable to agglomerate the crystals thereby providing masses which are more conveniently employed in conventional separation and adsorption equipment.

The agglomeration of molecular sieves presents several problems. Prime among these is the necessity of maintaining in large measure the adsorptive capacities and characteristics of the molecular sieves. Further difficulties are encountered with the alkalinity of the zeolities which tends to destroy or weaken many common types of binders. The regular uniform size of the crystals eliminates the interlocking surfaces that impart strength to many bonded objects. In the presence of water the molecular sieves dilate and thus resist compaction forces. Further, the use to which the bonded molecular sieves are to be put and their own peculiar characteristics often require cyclic heating to temperatures of between 350° C. and 650° C. to remove adsorbates from the molecular sieves.

It is the principal object of the present invention to provide an agglomerate of a molecular sieve and a binder which permits the more efficient use of the molecular sieves as an adsorbent. It is a further object of the invention to provide a bonded mass of molecular sieve such that the adsorptive properties of the molecular sieve are not materially affected. Still another object is to provide a bonded mass of molecular sieve that is attrition resistant. Other objects will be apparent from the disclosure and appended claims.

The objects of the invention are accompanied by binding a molecular sieve with a clay mineral such that the bonded product will maintain its strength when heated repeatedly to temperatures in excess of 350° C. The clay should be semi-plastic or plastic in the presence of water at atmospheric temperatures and capable of acquiring a substantial "green" strength upon exposure for short periods of time to the drying process of the air.

According to the process of the invention, the bonded molecular sieves are prepared by blending or mixing a binder and the sieve, and fashioning the mixture into pellets or other suitable forms. The pellets are in turn hardened by the setting of the binder. In a preferred practice the clay binder, molecular sieve and sufficient moisture to render the clay pliant are blended together. The mixture is extruded through a die, broken into pellets and the binder hardened by drying.

The amount of clay used in making the materials of the invention depends upon the strength required in the final product and the degree of dilution of the molecular sieves permissible. For most purposes a clay content of from 5% to 35% by weight of the final pellet is satisfactory and good results have been obtained with a clay content of as little as 1% and as high as 40% by weight. A preferred range for most applications is from 10% to 25% of clay by weight of pellet.

The pellets, however, prepared, are fired in a kiln at elevated temperatures. Both rotary and stationary furnaces have been found satisfactory for this firing step. The pellets after firing are suitable for use in adsorption processes.

The maximum temperature for the firing process is the highest temperature at which the molecular sieve is structurally stable. This is generally below about 700° C. In addition, a dry purge gas should be passed through the furnace during the firing operation to minimize the loss of adsorptive capacity of the molecular sieve.

The minimum temperature for firing the bonded molecular sieves is that temperature at which the clay will dry to give a bound product and at which the loss of the water of hydration of the molecular sieve will be effected. For best results, the clay-bonded molecular sieve should be fired at the temperature wherein the clay undergoes an irreversible phase change. For example, Attapulgus clay passes through an irreversible phase change between about 425° C. to about 520° C. This provides a product having maximum strength and attrition-resistance. However, this temperature will in some cases lie above the temperature at which the molecular sieve loses its structural stability. In such cases, the clay should only be dried. In general, the dried products are limited in use to those adsorption processes wherein continuous recycling and regenerating are unnecessary. However, the molecular sieve in the dried products retains its adsorption characteristics substantially unimpaired.

Examples of clays which may be employed for bonding molecular sieves without substantially altering the adsorptive properties of the molecular sieve are attapulgite, kaolin, sepiolite, polygarskite, kaolinite, plastic ball clays, clays of the attapulgite or kaolin types, bentonite, montmorillonite, illite, chlorite, and bentonite-type clay. Of these clays, the last five pass through an irreversible phase change above 700° C. which is above the temperature at which most molecular sieves lose their structural stability. Thus, if any of these five clays are to be used as a binder for such molecular sieves, the bonded product is only dried and activated rather than fired so as to effect the irreversible phase change in the clay.

In one method for practicing the process of the invention a clay binder is made into a slurry with water. Suitably the clay is added in an amount sufficient to account for from 10% to 25% of the weight of the final product. About 0.5% by weight of a clay dispersant has been found to aid in the preparation of the slurry. Another slurry, this one comprising the molecular sieve and water, is mixed with the clay slurry. The resulting slurry is filtered and the filter cake dried to about 40% water content. The filter cake may then be passed through an extruder having a die plate with openings of from about 1/16 of an inch to 1/8 of an inch in size. The extrusion is facilitated if the filter cake is mixed and kneaded prior to the extrusion. Additionally an increase in pellet strength can be traced to the prior mixing or kneading. Larger holes in the extrusion die may also be used but no particular advantage has been found in using openings smaller than 1/16 of an inch. The extruded material may be cut to the desired lengths to form pellets.

Some advantages in pelleting are realized when the surface of the extruded material, in the form of strands, is dried in the air and subsequently placed in an oven where it is dried at temperatures of up to about 180° F. The dried material which now has a substantial green strength is tumbled in a blender. This action breaks the extruded material into suitable lengths and gives rounded pellet edges.

In one specific example of the invention using the above-described method excellent results were obtained with a molecular sieve bonded with a North Carolina kaolin clay halloysite, fired in a rotary kiln at 650° C. using 500 cubic feet per hour of dry air as a purge gas. Excellent results have been obtained with the same clay and a different molecular sieve at temperatures of 575° C. and with 1000 cubic feet per hour of dry air as purge gas. Finely divided kaolins and ball clays containing large portions of kaolinite and relatively free from sand and shale impart adequate strength to the pellets when fired at temperatures of about 575° C.

The method and product of the invention are further demonstrated by the following example: 236 pounds of a dry synthetic molecular sieve, sodium zeolite A described in application Serial No. 400,388, now U.S. Patent 2,882,243, were placed in a kettle containing 200 gallons of water. A slurry containing 59 pounds of a kaolin clay and 0.3 pounds of a dispersant was prepared in 10 gallons of water. The clay slurry was added to the molecular sieve slurry and the resulting slurry filtered. The filter cake was dried to about 37% water content. After being mixed for two hours in a Lancaster mixer the cake was extruded through a die plate having circular holes of 1/16 of an inch in diameter. The strands from the die were collected on a conveyor belt where the surface of the strands was air-dried. The strands were collected in beds to a depth of from 3 to 4 inches and dried in a furnace at 180° F. From the drying furnace the strands were placed in a blender and tumbled to break the strands into pellet size. Dust was then removed from these pellets by screening. The pellets were fired in a rotary kiln at about 650° C. with dry air as a purge gas flowing at about 500 cubic feet per hour.

Zeolite A is a synthetic molecular sieve having a composition which may be represented as

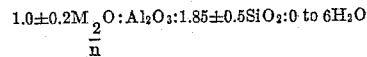

In this formula "M" represents a cation and "n" its valence.

The major lines of the X-ray diffraction pattern of zeolite A are shown in Table I. In obtaining the X-ray diffraction powder patterns, standard techniques were employed. The radiation was the $K\alpha$ doublet of copper, and a Geiger counter spectrometer with a strip chart pen recorder was used. The peak heights, I, and the positions as a function of $2\theta$, where $\theta$ is the Bragg angle, were read from the spectrometer chart. From these, $d$(obs.), the interplanar spacing in A., corresponding to the recorded lines was calculated.

TABLE I

*d Value of reflection in A.*

12.2 ±0.2
8.6 ±0.2
7.05±0.15
4.07±0.08
3.68±0.07
3.38±0.06
3.26±0.05
2.96±0.05
2.73±0.05
2.60±0.05

The pellets prepared in the foregoing example were subjected to attrition tests used as a standard by the armed forces and designated Joint Army-Navy Test No. 169. In this test only 1/2% of the weight of the pellets was lost due to attrition while losses for other adsorbents ran as high as 3 1/2%. In addition to their improved resistance to attrition losses, the materials of the invention exhibit compressive strength greater than that of either clay or molecular sieves alone extruded and fired under similar conditions.

The extent to which the adsorptive capacity of a molecular sieve pelleted according to the process of the invention is affected can be seen from the following data:

The molecular sieve prior to pelleting, as described in the foregoing example, adsorbed carbon dioxide in an amount equal to 17.9% of its weight at a pressure of 250 mm. and a temperature of 25° C. Pellets of the molecular sieve containing 20% by weight of clay adsorbed carbon dioxide in an amount equal to 14.3% of their weight under the same conditions. The reduction in adsorptive capacity of the material after pelleting based on its weight approximated 20% of the weight of the clay-bonded pellet indicating a high retention of adsorptive capacity.

Another process for preparing the bonded molecular sieves that has been employed satisfactorily comprises mixing clay in pellet or powder form with a molecular sieve powder in a muller-mixer. A muller-mixer, also called a pan mixer, putty chaser, or edge runner, has one or more large wheels (mullers) rolling around in a pan. Rotating scraper blades or plows continuously push material under the wheels and thus the muller-mixer combines kneading, grinding and mixing action to give very intimate mixtures. The sieve powder and the clay are partially wet and the mixture allowed to mull until it is plastic and suitable for extrusion. Pellets are then made, dried, and fired as discussed previously.

In tests employing this procedure with Avery clay, it was found that a good bonded molecular sieve resulted using 20 parts of Avery clay and 80 parts of molecular sieve. With Avery clay in these proportions, the total water content of the mixture should not exceed 38 weight percent (wet basis). In a specific example, 220 pounds of sodium zeolite A and 55 pounds of kaolin clay were placed in a muller-mixer and sufficient water added to bring the water content up to about 38 weight percent (wet basis). After about two and one-half hours of mixing, the batch was plastic and suitable for extrusion. The material was extruded and the extrusions were air dried at 190° F. for 16 hours followed by firing at 675° C. for 16 minutes using a 1600 cubic feet per hour air purge.

When the pelletized adsorbents previously described are subjected to severe abrasion or vibration as is common in moving or fluidized beds, some pellet breakage may occur at the edges of the cylindrical pellets. The dust and powder so formed may pack and clog the fluid system. In other systems it may be carried out of the system in the gaseous or liquid stream and be lost. Further, in deep-bed application, kaolin bonded extrusion may not be sufficiently crush-resistant.

A very strong and crush-resistant pellet may be prepared by forming the bonded molecular sieve into a spherical pellet.

For preparing the spherical forms, as with the other preparations previously described, the clay used as a binder must undergo an irreversible phase change when fired at a temperature below the temperature at which the molecular sieve materials become structurally unstable. For molecular sieves such as faujasite, chabazite, zeolite A, and zeolite X, this maximum firing temperature is about 700° C.

The clay should be amenable to division into a powder with a particle size small enough to allow interspersion with the molecular sieve crystals. A particle size less than 20 microns is generally satisfactory.

For minimum dusting in fluidized systems, the preferred pellet is an Attapulgus clay-bonded molecular sieve pellet having substantially spherical shape.

As little as 3 parts of Attapulgus clay to 97 parts of zeolite adsorbent will make spheroidal pellets. As much as 95 parts Attapulgus clay to 5 parts of zeolite adsorbent can be used without substantially harming the adsortive capacity of the molecular sieve other than by dilution. About 20 parts of clay to about 80 parts of zeolite is the preferred composition.

In preparing the spherical pellets of clay-bonded molecular sieve, clay, molecular sieve and water are blended by any means which insures thorough mixing. Water is present in an amount sufficient to attain a semi-plastic state.

In each of the following examples, after formation of the spheres they were air dried and fired.

Spheroidal pellets can be made in an intensive sigma-blade mixer. Slightly helical blades rotate in opposite directions across a trough giving a kneading, tearing, stretching and folding treatment to the material being mixed. The blend is placed in the mixer and water is added. After mixing for several hours, spheroidal pellets form.

Fifteen pounds of sodium zeolite A containing 25% water (dry basis); 2.82 pounds attapulgite (average particle size 0.077 micron); and 0.48 pound kaolin clay were blended together in an intensive sigma-blade mixer. About five pounds of water were added and the batch mixed for three and one-half hours. Fifteen-hundredths pounds of Sterotex (stearic acid) were added and after 75 minutes additional mixing time crude spheroidal pellets were formed $\frac{1}{16}$ inch to $\frac{1}{2}$ inch diameter. These pellets were air dried at 90° C. for two hours and then fired in a rotary kiln for 16 minutes at 650° C. The pellets were subjected to the jet attrition test and suffered a 23% loss.

Spheroidal pellets can also be formed in a muller-mixer by adding water to the blend either before or after it is placed in the mixer. The batch is then mulled for about an hour. At this point mulling stops and while the mixing goes on, the batch is dried up by adding more blend or directing a flow of air on the batch. Another hour of mixing will produce pellets.

A blend containing 61 pounds of sodium zeolite A (21 wt.-percent $H_2O$, dry basis) and 12 pounds attapulgite (particle size 0.077 micron) was prepared in a powder blender by mixing for 30 minutes. Thirty pounds of this blend were charged into a muller-mixer with 9.9 pounds of water. After 95 minutes of mixing, spheres averaging $\frac{1}{4}$ inch diameter were formed. Muller wheel was braked to prevent rotation. An unmeasured amount of the remaining dry blend was added to the mix during added mixing and the size of the sphere was reduced to about $\frac{1}{8}$ inch diameter. The pellets were air dried at 90° C. for two hours, fired at 650° C. for 16 minutes in a rotary kiln, and subjected to the jet attrition test. The loss was about 3.2 percent.

Spheroidal pellets can be made by mulling blended powders of molecular sieve and Attapulgus clay in a muller-mixer and charging the wet mix into a tumbling drum. Sufficient water is added in the muller-mixing step to make the batch plastic. The batch is then screened to remove agglomerates and the wet mix placed in the drum. The drum is then rotated at a speed that will bring the water to the surface of these finite particles; the speed is subsequently reduced slightly and the tumbling mass dried slightly with a blast of air. Spheroidal pellets are then formed by tumbling.

Forty-five pounds of sodium zeolite A and $9\frac{1}{4}$ pounds of Attapulgus clay were blended in a dry powder blender. The blended powders were transferred to a muller-mixer and 8000 cc. water added. After mulling for about 20 minutes, $3\frac{1}{4}$ pounds of the wet batch were transferred to the inclined drum. These wet particles were tumbled in the drum containing small flights at about 30 r.p.m. for 20 minutes. The material compacted and formed balls $\frac{1}{16}$ of an inch to $\frac{1}{2}$ inch in diameter. After tumbling for another $\frac{1}{2}$ hour, the drum rotation was decreased to about 14 r.p.m. and the batch dried up in a blast of air. They were removed from the drum and air dried at 90° C. for 2 hours. The pellets were subsequently fired for 16 minutes in a rotary kiln at a hearth temperature of 650° C. and an air purge of 12 cubic feet per hour per pound of product per hour.

In the following tables, several tests were employed to show the properties of the spheroidal and the extruded clay-bonded molecular sieves. They are described in detail below.

*Air jet attrition test*

The apparatus used for this test is an inverted conical flask with a hole in the bottom, fitted with a screen. The pellets are placed in the flask and air blown through. The pellets strike each other and the side of the flask in this blast of air and dust passes through the screen. Thirty grams of pellets are subjected to the air blast for 30 minutes. The screen used varied with the size of the pellet being tested.

*Ball mill hardness test*

The apparatus used in this test consists of a jar with a steel liner. Inside the jar are placed seven steel balls, $\frac{1}{2}$ inch in diameter. The pellets are placed in the jar, tumbled for 15 minutes, screened, and the percent survival measured.

*Penny attrition test*

This test is an adaptation of Military Specification Test MIL-D 3716 (4.8.4.1—apparatus). One hundred fifty grams of pellets are placed in an apparatus consisting of a shaker and a covered pan with a screen separating the sample from the dust formed by the shaking. Five copper discs (of the size and weight of 1-cent pieces) are included with the sample. After shaking for 15 minutes at 285 r.p.m. the percent loss is calculated by weighing the particles that pass through the screen.

*Wet attrition test*

In this test, 100 cc. (unsettled) zeolite pellets are placed in a 4 oz. wide mouth jar ($1\frac{7}{8}''$ inside diameter x $2\frac{7}{8}''$ high). Fifty cc. of trichloroethylene are added, the jar sealed, and placed on a vertical pulsating mechanism having a vertical stroke of $1\frac{3}{4}$ inches and a frequency of 330 cycles per minute. Pulsation goes on for 450,000 cycles. The jar is removed and the dust is washed from the pellets using trichloroethylene and filtered with a screen U.S. sieve size 100 mesh. Trichloroethylene is then evaporated and the percent loss calculated.

"Zig-zag" test

The testing apparatus consists of an air lift tube 1.45 inches in diameter and 9 feet 5 inches high. The tube is bent at nine inch intervals to form twelve 105° reverse turns. It is equipped with an air flow regulator, dust separator and sample holding leg. In the tests, the pellets are cycled 2000 times.

Table II shows some of the physical characteristics of the various bonded molecular sieves under the conditions of the tests just described.

TABLE II
*Strength data of clay-bonded pellets*

| Sieve Type | Binder | Pellet | Jet Attrition Index [1] | Ball Mill Hardness Index [1] | Wet Attrition Index [2] | Preparation |
|---|---|---|---|---|---|---|
| Sodium Zeolite A | Kaolin | ⅛″ cylinder | 78.4 | 47.1 | 10.0 | Extruded. |
| Do | do | ¹⁄₁₆″ cylinder | 52.2 | 29.8 | 5.4 | Do. |
| Do | do | ⅛″ sphere | 0 | 5.9 | | Intensive. |
| Do | Attapulgite (.077μ) | do | 76.7 | 50.5 | 8.2 | Do. |
| Do | 0.077μ Attapulgite | do | 96.0 | 39.9 | 4.7 | Muller. |
| Do | Attapulgite (.077μ) | do | 96.8 | 48.0 | 6.2 | Do. |
| Do | do | do | 100.0 | | 5.9 | Drum-10″ lg. |
| Do | do | ¹⁄₁₆″ sphere | 86.3 | 28.3 | 1.4 | Muller. |
| Do | 0.077μ Attapulgite | do | 75.1 | 31.9 | 4.0 | Do. |
| Do | 2.9 Attapulgite (2.9μ) | ⅛″ sphere | 43.0 | 7.4 | 15.3 | Do. |
| Do | do | ¹⁄₁₆″ sphere | 0 | 26.3 | 13.3 | Do. |
| Do | Attapulgite (0.32μ) | do | 0 | 15.3 | 7.8 | Do. |
| Calcium Zeolite A | Kaolin | ⅛″ cylinder | 40.8 | 10.0 | 13.0 | Extruded. |
| Do | do | ¹⁄₁₆″ cylinder | 0 | 7.0 | 7.2 | Do. |
| Do | Attapulgite | ⅛″ sphere | 92.2 | 12.4 | 8.3 | Muller. |
| Do | do | ¹⁄₁₆″ sphere | 40.6 | 11.3 | 3.8 | Do. |
| Sodium Zeolite X | Kaolin | ⅛″ cylinder | 2.7 | 11.5 | 16.5 | Extruded. |
| Do | do | ¹⁄₁₆″ cylinder | 0 | 17.9 | 8.1 | Do. |
| Do | Attapulgite | ⅛″ sphere | 69.5 | 9.8 | 10.0 | Muller. |
| Do | do | ¹⁄₁₆″ sphere | 35.6 | 7.1 | 6.1 | Do. |

[1] Percent survival plus 10 mesh for ⅛″ and 4 x 8 mesh material; plus 14 mesh for smaller material.
[2] Percent fines minus 100 mesh. Test run in trichloroethylene.

Table III shows the effect of activation on the attrition characteristics of kaolin-bonded cylindrical extrusion and attapulgite-bonded spheres of sodium zeolite A. As may be seen from these data, activation of the pellets generally improves their attrition resistance. It is also to be noted that the attapulgite spheres are generally much more attrition resistant than the kaolin-bonded cylinders. However, even the more serious attrition losses were not what is generally considered excessive.

TABLE III
*Strength data hydrated and activated attapulgite spheres and kaolin extrusions of sodium zeolite A*

| Binder | Pellet Size | Wet Attrition Index [1] | | Penny Attrition Index [2] | |
|---|---|---|---|---|---|
| | | Act. | Hyd. | Act. | Hyd. |
| Kaolin | ⅛″ extrusion | | | 0.25 | 0.53 |
| Do | do | 10.2 | 11.6 | | |
| Do | ¹⁄₁₆″ extension | | | 0.24 | 0.57 |
| Do | do | 4.6 | 12.9 | | |
| Attapulgite (.077μ) | ⅛″ diameter sphere | 6.2 | 5.0 | 0.04 | 0.04 |
| Do | ¹⁄₁₆″ diameter sphere | 4.7 | 5.9 | 0.05 | 0.10 |

[1] Percent fines minus 100 mesh (100 mesh=.006 inch diameter).
[2] Percent fines minus 30 mesh. Test MIL-D-3716 (30 mesh=.023 inch diameter).

Table IV shows the effect of bonding on adsorption characteristics of molecular sieves. Since 20 percent of the bonded product is binder, the adsorption by the bonded sieve should be about 80 percent of that for the powder. As may be seen from the data of Table IV, very little loss of adsorption results from bonding in any of the examples.

TABLE IV
*Equilibrium adsorption data for attapulgite spheres and kaolin extrusions vs. unbonded molecular sieve powder bonded product contains 20% binder*

| Sieve Type | Binder | Pellet Size | Adsorption $CO_2$, 250 mm. Hg 25° C., Wt.—Percent | |
|---|---|---|---|---|
| | | | Pellets | Powder |
| Sodium A | Kaolin | ⅛″ extrusion | 14.1 | 17.6 |
| Do | do | ¹⁄₁₆″ extrusion | 13.7 | 17.5 |
| Do | Attapulgite (.077μ) | ⅛″ diameter sphere | 14.5 | 17.4 |
| Do | do | ¹⁄₁₆″ diameter sphere | 14.7 | 17.4 |
| Calcium A | Kaolin | ⅛″ extrusion | 17.1 | 23.0 |
| Do | do | ¹⁄₁₆″ extrusion | 17.5 | 22.8 |
| Do | Attapulgite (0.077μ) | ⅛″ diameter sphere | 17.5 | 22.2 |
| Do | do | ¹⁄₁₆″ diameter sphere | 17.5 | 22.2 |
| Sodium X | Kaolin | ⅛″ extrusion | 17.6 | 23.2 |
| Do | do | ¹⁄₁₆″ extrusion | 17.3 | 22.8 |
| Do | Attapulgite (.077μ) | ⅛″ diameter sphere | 18.4 | 22.0 |
| Do | do | ¹⁄₁₆″ diameter sphere | 18.3 | 22.0 |

Table V shows the rate of adsorption of 1/16 inch cylinders and through 4 mesh, on 8 mesh, and through 8 mesh and on 12 mesh spheres of bonded molecular sieves for carbon dioxide and ethylene. As may be seen from these data, substantially fully capacity for carbon dioxide is attained in about 90 minutes and for ethylene in about 280 minutes whether in pellet or sphere form. In general, the pellets attain full capacity before the spheres.

TABLE V

*Adsorption rate data of attapulgite spheres and kaolin extruded pellets sodium zeolite A*

| Time (Minutes) | Percent of Equilibrium Capacity for $CO_2$ | | | Percent of Equilibrium Capacity for $C_2H_4$ | | |
|---|---|---|---|---|---|---|
| | 1/16" Cylinders | 4 x 8 Spheres | 8 x 12 Spheres | 1/16" Cylinders | 4 x 8 Spheres | 8 x 12 Spheres |
| 20 | 78 | 71 | 73 | 65 | 61 | 65 |
| 40 | 95 | 91 | 92 | 97 | 94 | 87 |
| 60 | 98.5 | 97 | 97 | 98 | 96.5 | 91 |
| 80 | 100 | 98.5 | 98.6 | 98.5 | 97.0 | 92.5 |
| 90 | 100 | 100 | 100 | | | |
| 100 | 100 | 100 | 100 | 98.5 | 98.0 | 94 |
| 160 | | | | 99.5 | 99.5 | 96.5 |
| 220 | | | | 100 | 100 | 98.5 |
| 280 | | | | 100 | 100 | 100 |

As may be seen from the data in the above tables, the strength properties of the final bonded pellet depend to a large extent on the choice of shape and clay binder. For example kaolin clays are generally perferred as the binding material for extruded pellets. However, while spheres may be prepared, the fired spheres have limited strength. This is illustrated by the following example.

Five pounds of sodium zeolite A containing clay were dry-blended and then mixed in a muller-mixer for two and one-half hours with 800 milliliters of water. The spheres so formed were fired for about 16 minutes at 650° C. When subjected to the air jet test and the ball mill test, the loss due to attrition was extensive. However, these pellets had good wet strength as is evidenced by a survial of 87.8 percent of the spheres when they were subjected to the wet attrition test.

On the other hand, attapulgite-bonded spheres have superior fired strength to the attapulgite-bonded extrusions. This is illustrated by the following example.

Fifteen pounds of sodium zeolite A containing 26 percent water were dry-blended, and then mixed in an intensive sigma-blade mixer with 2500 milliliters of water. The resultant mixture was extruded, and the extrusions were air-dried and fired at 650° C. for eight minutes. The survivals of the extruded pellets when subjected to the air jet test, ball mill test and the wet attrition test were 76 percent, 49 percent and 91.31 percent, respectively.

With some clay-binders such as montmorillonite, the green and fired strength of the pellets is good when the pellet is dry but seriously injured by water. An example of the preparation of a montmorillonite clay-bonded molecular sieve follows.

Fifteen pounds of sodium zeolite A having a water content of 22.4 percent were blended with 3 pounds of montmorillonite clay and placed in a sigma-blade mixer. To this mixture were added 2500 milliliters of water and the entire mass was mixed for an hour and fifteen minutes until it was plastic. The plastic batch was extruded into 1/8 inch cylinders which were air-dried overnight at 190° F. and then fired at 650° C. for eight minutes with an air purge of 500 cubic feet per hour per pound of product. The fired product had an 82.7 percent survival to the air jet test, 73.8 percent survival to the ball mill hardness test and 85.4 percent to the wet attrition test.

Another variation of properties is typified by pellets bonded with Jackson ball clay. The pellets have excellent green strength but low fired strength.

In an example of such a product, 15 pounds of sodium zeolite A and 2.8 pounds of Jackson ball clay were blended thoroughly and then mixed with 2500 milliliters of water for four hours. The plastic material was extruded into 1/8 inch cylinders, air-dried at 190° F. overnight, and fired at 650° C. for 8 minutes with an air purge of 500 cubic feet per hour per pound of product. This product had a survival of 21.5 percent to the air jet test, 22.7 percent survival to the ball mill hardness test, and 89.9 percent survival to the wet attrition test.

It will be understood that the blending of the molecular sieves with clay binder need not be limited to the methods described in the examples above. The molecular sieve in the form of a powder may be milled into wet clay. Clay can be milled into a wet molecular sieve. The resulting mixture can then be extruded and processed to harden the binder. Other blending techniques will suggest themselves to those skilled in the art.

This is a continuation-in-part of patent application Serial No. 519,676, filed July 1, 1955, now abandoned.

What is claimed is:

1. An agglomerate comprising a crystalline zeolitic molecular sieve and a clay mineral binder, said agglomerate having been formed from a mixture into a mass and fired at a temperature sufficiently high to dry said clay mineral binder, provide a bound product, and activate said crystalline zeolitic molecular sieve, the firing temperature being below that temperature at which said crystalline zeolitic molecular sieve is structurally unstable.

2. An agglomerate comprising crystals of a crystalline zeolitic molecular sieve and a binder of a clay mineral, said clay mineral comprising between 1% and 40% by weight of said agglomerate, said agglomerate having been formed from a mixture into a mass and fired at a temperature sufficiently high to dry said clay mineral binder, provide a bound product, and activate said crystalline zeolitic molecular sieve, the firing temperature being below that temperature at which said crystalline zeolitic molecular sieve is structurally unstable.

3. An agglomerate comprising crystals of a crystalline zeolitic molecular sieve and a binder of at least one of the clay minerals in the group consisting of attapulgite, kaolin, sepiolite, polygarskite, kaolinite, plastic ball clays, clays of the attapulgite types, clays of the kaolin types, bentonite, montmorillonite, illite, chlorite, and bentonite-type clay, said agglomerate having been formed from a mixture into a mass and fired at a temperature sufficiently high to dry said clay mineral binder, provide a bound product, and activate said crystalline zeolitic molecular sieve, the firing temperature being below that temperature at which said crystalline zeolitic molecular sieve is structurally unstable.

4. An agglomerate comprising crystals of a crystalline zeolitic molecular sieve and a binder of at least one of the clay minerals in the group consisting of attapulgite, kaolin, sepiolite, polygarskite, kaolinite, plastic ball clays, clays of the attapulgite types, clays of the kaolin types, bentonite, montmorillonite, illite, chlorite, and bentonite-type clay, said binder comprising from 1% to 40% by weight of said agglomerate, said agglomerate having been formed from a mixture into a mass and fired at a temperature sufficiently high to dry said clay mineral binder, provide a bound product, and activate said crystalline zeolitic molecular sieve, the firing temperature being below that temperature at which said crystalline zeolitic molecular sieve is structurally unstable.

5. An agglomerate comprising crystals of a crystalline zeolitic molecular sieve and a binder of at least one of the clay minerals in the group consisting of attapulgite, kaolin, sepiolite, polygarskite, kaolinite, plastic ball clays, clays of the attapulgite types, clays of the kaolin types, bentonite, montmorillonite, illite, chlorite, and bentonite-type clay, said binder comprising from 10% to 25% by weight of said agglomerate, said agglomerate having been formed from a mixture into a mass and fired at a temperature sufficiently high to dry said clay mineral binder, provide a bound product, and activate said crystalline zeolitic molecular sieve, the firing temperature being below that temperature at which said crystalline zeolitic molecular sieve is structurally unstable.

6. An agglomerate as described in claim 5 wherein said crystalline zeolitic molecular sieve is sodium zeolite A and said clay mineral is attapulgite.

7. An agglomerate as described in claim 5 wherein said crystalline zeolitic molecular sieve is calcium zeolite A and said clay mineral is attapulgite.

8. An agglomerate as described in claim 5 wherein said crystalline zeolitic molecular sieve is sodium zeolite A and said clay mineral is kaolin.

9. An agglomerate as described in claim 5 wherein said crystalline zeolitic molecular sieve is calcium zeolite A and said clay mineral is kaolin.

10. An agglomerate as described in claim 5 wherein said crystalline zeolitic molecular sieve is sodium zeolite X and said clay mineral is attapulgite.

11. An agglomerate as described in claim 5 wherein said crystalline zeolitic molecular sieve is sodium zeolite X and said clay mineral is kaolin.

12. An adsorbent pellet comprising a substantially uniform mixture of a crystalline zeolitic molecular sieve and a kaolin clay, said pellet having been formed from a mixture into a substantially cylindrical shape and fired below that temperature at which said crystalline zeolitic molecular sieve is structurally unstable and above about 575° C.

13. An adsorbent pellet in accordance with claim 12 which comprises about 20 percent kaolin clay and about 80 percent molecular sieve.

14. An adsorbent pellet as described in claim 12 wherein said crystalline zeolitic sieve is sodium zeolite A.

15. An adsorbent pellet as described in claim 12 wherein said crystalline zeolitic sieve is calcium zeolite A.

16. An attrition-resistant, adsorbent pellet comprising a substantially uniform mixture of a crystalline zeolitic molecular sieve and an Attapulgus clay, said pellet having been formed from a mixture into a substantially spherical shape and fired below that temperature at which said crystalline zeolitic molecular sieve is structurally unstable and above about 425° C.

17. An attrition-resistant adsorbent pellet in accordance with claim 16 which comprises about 20 percent Attapulgus clay and about 80 percent molecular sieve.

18. An adsorbent pellet as described in claim 16 wherein said crystalline zeolitic sieve is sodium zeolite A.

19. An adsorbent pellet as described in claim 16 wherein said crystalline zeolitic sieve is calcium zeolite A.

20. An adsorbent pellet as described in claim 16 wherein said crystalline zeolitic sieve is sodium zeolite X.

21. A process for producing an agglomerate of crystals of a crystalline zeolitic molecular sieve and a clay mineral, said process comprising blending said molecular sieve, said clay mineral and moisture, compacting and drying said blended materials and firing said blended materials at a temperature sufficiently high to dry said clay mineral, provide a bound product, and activate said crystalline zeolitic molecular sieve, the firing temperature being below that temperature at which said crystalline zeolitic molecular sieve is structurally unstable.

22. A process for producing an agglomerate of crystals of a crystalline zeolitic molecular sieve and a clay mineral comprising providing an aqueous slurry of said molecular sieve and said clay; separating the solids from said slurry; compacting and drying said solids; dividing said solids into discrete particles; and firing said discrete particles at a temperature sufficiently high to dry said clay mineral, provide a bound product, and activate said crystalline zeolitic molecular sieve, the firing temperature being below that temperature at which said crystalline zeolitic molecular sieve is structurally unstable.

23. A process in accordance with claim 22 wherein the average particle size of the clay mineral in said aqueous slurry is less than about 20 microns.

24. A process for producing an agglomerate of crystals of a crystalline zeolitic molecular sieve and at least one clay mineral selected from the group consisting of attapulgite, kaolin, sepiolite, polygarskite, kaolinite, plastic ball clays, clays of the attapulgite types, clays of the kaolin types, bentonite, montmorillonite, illite, chlorite, and bentonite-type clay, which process comprises providing an aqueous slurry of said molecular sieve and of said clay mineral wherein the average particle size of said clay mineral is less than 20 microns; separating the solids from said slurry; compacting and drying said solids; dividing said solids into discrete particles; and firing said discrete particles below that temperature at which said crystalline zeolitic molecular sieve is structurally unstable and above about 400° C.

25. A process for producing an agglomerate of crystals of a crystalline zeolitic molecular sieve and a clay mineral comprising mixing clay powder and zeolitic molecular sieve powder; adding water to said powder mixture in an amount to provide a plastic material when mixed; mixing said wet powder mixture until it is plastic; forming said plastic mixture into discrete particles; drying said discrete particles; and firing said dried discrete particles at a temperature sufficiently high to dry said clay mineral, provide a bound product, and activate said crystalline zeolitic molecular sieve, the firing temperature being below that temperature at which said crystalline zeolitic molecular sieve is structurally unstable.

26. A process in accordance with claim 25 wherein the dry powder mixture comprises about 20 parts kaolin clay and about 80 parts zeolitic molecular sieve powder, and wherein the total water content of the wet powder mixture does not exceed about 38 percent, wet basis, and wherein the plastic material is formed by extrusion means.

27. A process for producing an agglomerate of crystals of a crystalline zeolitic molecular sieve and a clay mineral, said process comprising blending said crystalline zeolitic molecular sieve and said clay mineral; forming the blended materials into an agglomerate; and firing the formed agglomerate at a temperature sufficiently high to dry said clay mineral, provide a bound product, and activate said crystalline zeolitic molecular sieve, the firing temperature being below that temperature at which said crystalline zeolitic molecular sieve is structurally unstable.

28. A process for producing an attrition-resistant, adsorbent pellet which comprises blending a crystalline zeolitic molecular sieve, Attapulgus clay having a particle size less than about 20 microns, and water; substantially compacting said blended material as spheres; drying said spherical compacts; and firing said dried spherical compacts below the temperature at which said crystalline zeolitic molecular sieve is structurally unstable and above about 400° C.

29. A process in accordance with claim 28 wherein the dried spherical compacts are fired at a temperature above about 425° C.

References Cited in the file of this patent

UNITED STATES PATENTS

| 2,306,610 | Barrer | Dec. 29, 1942 |
| 2,413,134 | Barrer | Dec. 24, 1946 |
| 2,460,811 | Davies et al. | Feb. 8, 1949 |
| 2,727,868 | Simpson et al. | Dec. 20, 1955 |
| 2,728,733 | Hashimoto | Dec. 27, 1955 |

OTHER REFERENCES

J. Chem Soc., of 1948, pp. 2158–2163.

Mellor's "Treatise of Inorganic and Theoretical Chemistry," vol. 6, of 1925, p. 568.